(12) United States Patent
Oh et al.

(10) Patent No.: US 8,643,483 B2
(45) Date of Patent: Feb. 4, 2014

(54) SYSTEM FOR MAINTAINING CONSUMABLES OF VEHICLE AND METHOD THEREOF

(75) Inventors: Chi Nam Oh, Gyeonggi-do (KR); In-Ho Yoon, Seoul (KR); Yun Joong Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 377 days.

(21) Appl. No.: 13/035,275

(22) Filed: Feb. 25, 2011

(65) Prior Publication Data
US 2012/0119897 A1 May 17, 2012

(30) Foreign Application Priority Data
Nov. 17, 2010 (KR) .................. 10-2010-0114700

(51) Int. Cl.
*B60Q 1/10* (2006.01)
*G01M 17/00* (2006.01)
*G07C 5/00* (2006.01)

(52) U.S. Cl.
USPC .......... 340/457.4; 340/450.3; 340/457; 340/438; 701/29.5; 701/29.4; 702/184

(58) Field of Classification Search
USPC .............. 340/457.4, 450.3; 701/29.5, 29.4
See application file for complete search history.

(56) References Cited

U.S. PATENT DOCUMENTS

| | | | | |
|---|---|---|---|---|
| 5,819,201 A | * | 10/1998 | DeGraaf | 701/29.4 |
| 6,580,366 B1 | * | 6/2003 | Engfehr | 340/457.4 |
| 7,142,101 B2 | | 11/2006 | Morris | |
| 7,535,347 B2 | * | 5/2009 | Larson et al. | 340/457.4 |
| 7,545,262 B2 | | 6/2009 | Batchik | |
| 2009/0144104 A1 | | 6/2009 | Johnson | |

FOREIGN PATENT DOCUMENTS

| | | |
|---|---|---|
| JP | 2004-324598 A | 11/2004 |
| KR | 20-2002-0030594 | 10/2002 |
| KR | 10-2010-0022753 A | 3/2010 |

* cited by examiner

*Primary Examiner* — Donnie Crosland
(74) *Attorney, Agent, or Firm* — Edwards Wildman Palmer LLP; Peter F. Corless

(57) ABSTRACT

A system for maintaining a plurality of vehicle consumables includes a storage unit configured to store a consumable maintenance list according to an engine type and a transmission type of a vehicle; a control unit configured to control recommendation of when to change the consumable by calculating a change interval of each consumable and an actual consumption distance in the consumable maintenance list; and a display unit configured to display a screen that recommends when to change a particular consumable.

14 Claims, 4 Drawing Sheets

SYSTEM FOR MAINTAINING CONSUMABLES OF VEHICLE AND METHOD THEREOF

CROSS-REFERENCES TO RELATED APPLICATIONS

Priority to Korean patent application number 10-2010-0114700, filed on Nov. 17, 2010, which is hereby incorporated by reference in its entirety, is claimed.

BACKGROUND OF THE INVENTION

1. Field of the Invention

The present invention relates to a method and a system for maintaining consumables, and more particularly, to a technology for automatically managing maintenance of consumables of a vehicle depending on an engine type and a transmission type of the vehicle and determining a change interval for each consumable based on a driving distance, driving environment, and a degradation degree and a life limit of the consumable so that a driver can be notified of when to change the consumable when the vehicle is due for change of the consumable.

2. Description of the Related Art

Many vehicles require the use of consumables such as, oil filters, air filters, brakes, tires, lubricants, engine oil, light bulbs, car batteries, etc which need to be maintained or replaced in order to keep a vehicle in good running order. In general, many vehicle consumables need to be replaced each time a predetermined distance has been traveled. If the vehicle consumables are not replaced at manufacturers suggested intervals, a vehicle may wear faster or easily break down and can have a higher chance of an accident.

Therefore, a driver needs to remember or keep a record of when to change consumables, including lubricants, such as engine oil or transmission oil, a cooling fluid, or brake pads, etc. so that the consumables can be replaced when needed.

However, busy drivers often forgets to replace the consumable at an appropriate service interval such that the consumable is replaced only after it is too late causing the vehicle to break down because of lack of maintenance.

SUMMARY OF THE INVENTION

The present invention has been made in view of the above problems, and provides automatic management of change intervals of consumables depending on an engine type and a transmission type of a vehicle.

Also, the present invention determines the change intervals for the consumables based on a driving distance, driving environment, and degradation degree and a life limit of each particular consumable and notifies a driver of when to change the consumable when the vehicle is due for change of the consumable.

In accordance with an aspect of the present invention, a system is provided for maintaining a consumable which includes a storage unit configured to store a consumable maintenance list according to an engine type and a transmission type of a vehicle; a control unit configured to control a recommendation of when to change the consumable by calculating a change interval of each consumable and an actual consumption distance in the consumable maintenance list; and a display unit configured to display on a screen a recommendation of when to change the consumable.

In the exemplary embodiment of the present invention, the control unit is configured to determine the change interval as a first change interval for a general condition or as a second change interval for a severe condition depending on road environment information and driving habit information. The control unit is configured to calculate a degradation weight for each temperature range by using a temperature value of the consumable measured by a sensor. The control unit is also configured to calculate the actual consumption distance by using an actual travel distance and the degradation weight. In doing so, the control unit is able to calculate a consumption rate of the consumable by comparing the actual consumption distance and the change interval. Additionally, the control unit is configured to display a screen that recommends a change of the consumable when the consumption rate of the consumable is equal to or greater than a reference value, and is configured to control a display a screen that recommends the change of the consumable depending on whether a life limit of the consumable is reached when the consumption rate of the consumable is less than the reference value. The control unit may also configured to display a screen that recommends the change of the consumable when the consumption rate of the consumable is less than the reference value and the life limit of the consumable is reached.

In accordance with another aspect of the present invention, provided is a method of maintaining a consumable, the method which includes collecting, within a vehicle, engine and transmission information of the vehicle; creating and storing a consumable maintenance list based on the collected engine and transmission information of the vehicle; calculating a change interval of each consumable and an actual consumption distance in the consumable maintenance list; and notifying about when to change the consumable according to the change interval and the actual consumption distance.

More specifically, the change interval of each consumable and the actual consumption distance is calculated by using received road environment information from a user and generating driving habit information by using vehicle speed information. The change interval is then determined as a first change interval for a general condition or as a second change interval for a severe condition by using the road environment information and the driving habit information. Next, a degradation weight is calculated according to a temperature range value of the consumable. Then using the calculated weight, the actual consumption distance is calculated and a consumption rate of the consumable is calculated by comparing the change interval and the actual consumption distance.

In some embodiments of the present invention, the road environment information used for generating the driving habitat information may be collected through, e.g., a navigation or a global positioning system (GPS). Additionally, the actual consumption distance may be calculated by multiplying an actual travel distance of the vehicle by the degradation weight.

Furthermore, in some embodiments of the present invention, notifying about when to change the consumable may include recommending when to change the consumable when the consumption rate of the consumable is equal to or greater than a reference value; and recommending when to change the consumable depending on whether a life limit of the consumable is reached when the consumption rate of the consumable is less than the reference value. Recommending when to change the consumable depending on whether the life limit of the consumable is reached may also include recommending when to change the consumable when the consumption rate of the consumable is less than the reference value and the life limit of the consumable is reached.

In accordance with still another aspect of the present invention, a method of maintaining a consumable is also provided.

Initially, a first change interval of the consumable is generated for a general condition and a second change interval of the consumable is generated for a severe condition using road environment information and driving habit information. Then a degradation weight is calculated according to a temperature range value of the consumable. Next, according based on the calculated degradation weight, an actual consumption distance is calculated with is used to calculate a consumption rate of the consumable by comparing the actual consumption distance with the first change interval of the consumable for the general condition or the second change interval of the consumable for the severe condition. Based on the calculated consumption rate and a life limit of the consumable a recommendation is made regarding when to change the consumable on a display screen in the vehicle.

As noted above, recommending when to change the consumable may include: recommending when to change the consumable when the consumption rate of the consumable is equal to or greater than a reference value; and recommending when to change the consumable when the consumption rate of the consumable is less than the reference value and the life limit of the consumable is reached. Also as noted above, the actual consumption distance may be calculated by multiplying an actual travel distance of the vehicle by the degradation weight.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
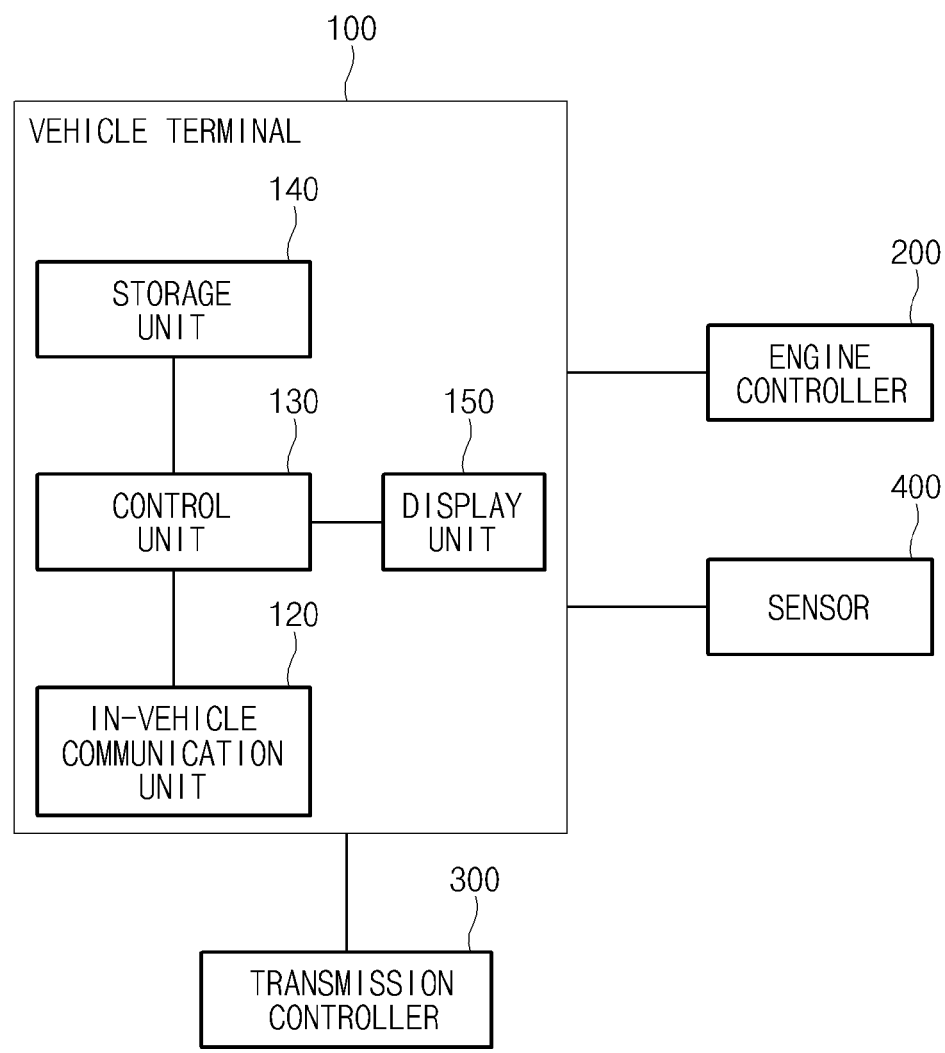
FIG. 1 is a diagrammatic view illustrating a configuration of a system for maintaining a consumable according to an exemplary embodiment of the present invention.

FIG. 1 is a view illustrating a configuration of a system for maintaining a consumable according to an exemplary embodiment of the present invention.

First, the system includes a vehicle terminal 100, an engine controller 200, a transmission controller 300, and a sensor 400. In this embodiment of the present invention, the vehicle terminal 100, the engine controller 200, the transmission controller 300, and the sensor 400 receive and transmit information via controller area network (CAN) communication which extends throughout a vehicle. The vehicle terminal 100, in association with the engine controller 200, the transmission controller 300 and the sensor 400, manages an interval for changing the consumable. Here, the vehicle terminal 100 may include, for example, a Telematics or a Car Ubiquitous System (CUbiS), which as also been invented by Applicant.

To this end, the vehicle terminal 100 includes an in-vehicle communication unit 120, a control unit 130, a storage unit 140 and a display unit 150.

The in-vehicle communication unit 120 performs in-vehicle communication, for example, CAN communication with the engine controller 200, the transmission controller 300, and the sensor 400.

The control unit 130 determines a change interval depending on whether a vehicle is driven under a general condition or under a severe condition by using driving environment information (i.e., road condition information and driving habit information). To this end, the control unit 130 extracts driving information such as rapid acceleration/deceleration and speeding by using vehicle speed information and generates the driving habit information, e.g., an economic driving habit, a normal driving habit, or a reckless driving habit, based on the driving information. Also, the control unit 130 may receive, from a user, road environment information such as local streets, highways, unpaved roads, or paved roads which are typically driven over by the vehicle. Alternatively, the control unit 130 may collect the driving environment information through, for example, a Global Positioning System (GPS). A driver is assumed to have the reckless driving habit when the driver frequently exhibits, for example, speed or rapid acceleration/deceleration that shortens a life of the consumable. The driver is, however, assumed to have the economic driving habit when the driver has a minimum showing of, for example, the speed or the rapid acceleration/deceleration that shortens the life of the consumable. The normal driving habit, on the other hand, is between the reckless driving habit and the economic driving habit.

The control unit 130 determines highway driving by the driver having the economic driving habit as the general condition, and determines local, street driving by the driver having the reckless driving habit as the severe condition.

The control unit 130 may also detect a temperature value of each consumable measured by the sensor 400 thereby allowing the control unit to calculate a degradation weight based on the detected temperature value of the consumable. For example, if the temperature of the consumable is in a range of about 10° C.-15° C. (50° F.-59° F.), the degradation weight can be set as 1.2, and if the temperature of the consumable is in a range of about 16° C.-20° C. (601° F.-68° F.), the degradation weight can be set as 1.5, and if the temperature of the consumable is in a range of about 21° C.-25° C. (70° F.-77° F.), the degradation weight can be set as 1.7.

The control unit 130 calculates an actual consumption distance by multiplying the change interval by the degradation weight, as shown in the following Equation 1:

(Actual Consumption Distance)=(Actual Travel Distance)×(Degradation Weight), wherein the degradation weight is, for example, between 1.0~2.0. [Equation 1]

Next, the control unit 130 compares the change interval for each condition with an actual consumption distance to calculate a consumption rate of the consumable as shown in the following Equation 2, and if the consumption rate is equal to or greater than a reference value, the display unit 150 is controlled to display a screen that recommends replacement or a maintenance check of the specific consumable, e.g., tires, brakes, oil filter, brake fluid, etc.

(Actual Consumption Distance)/(Change Interval)×100=Consumption Rate (%) [Equation 2]

In the illustrated embodiment of the present invention, the storage unit 140 stores a consumable maintenance list, the driving habit information, the vehicle speed information, the actual consumption distance, the temperature value of each consumable, transmission information, engine information, etc. This consumable maintenance list includes information such as a name, a life limit, a change interval (for the general condition and the severe condition), a consumption rate, and a degradation degree of each consumable.

Figure 4:
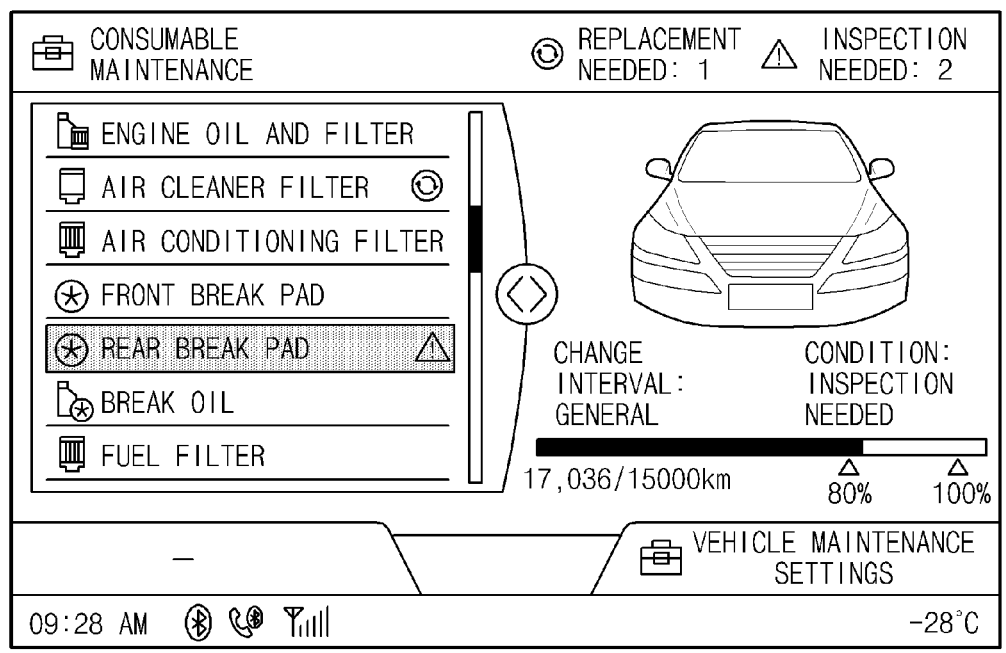
FIG. 4 shows an example screen on a display unit illustrating an interval for changing a vehicle consumable.

The display unit 150 displays a screen that notifies the driver of when to perform replacement or check of the consumable. An exemplary screen is shown in FIG. 4, which recommends replacing the consumable. Specifically, FIG. 4 shows an example in which an interval for replacing a rear wheel brake pad is reached.

The controller 130 is transmitted information from various controllers throughout the vehicle. For example, the engine controller 200 transmits information of the vehicle such as the engine information or the vehicle speed information to the controller 130, transmission controller 300 transmits the transmission information of the vehicle, and the sensor 400, which may for example be a heat sensor, measures and transmits the temperature of the consumables to the controller 130

Figure 2:
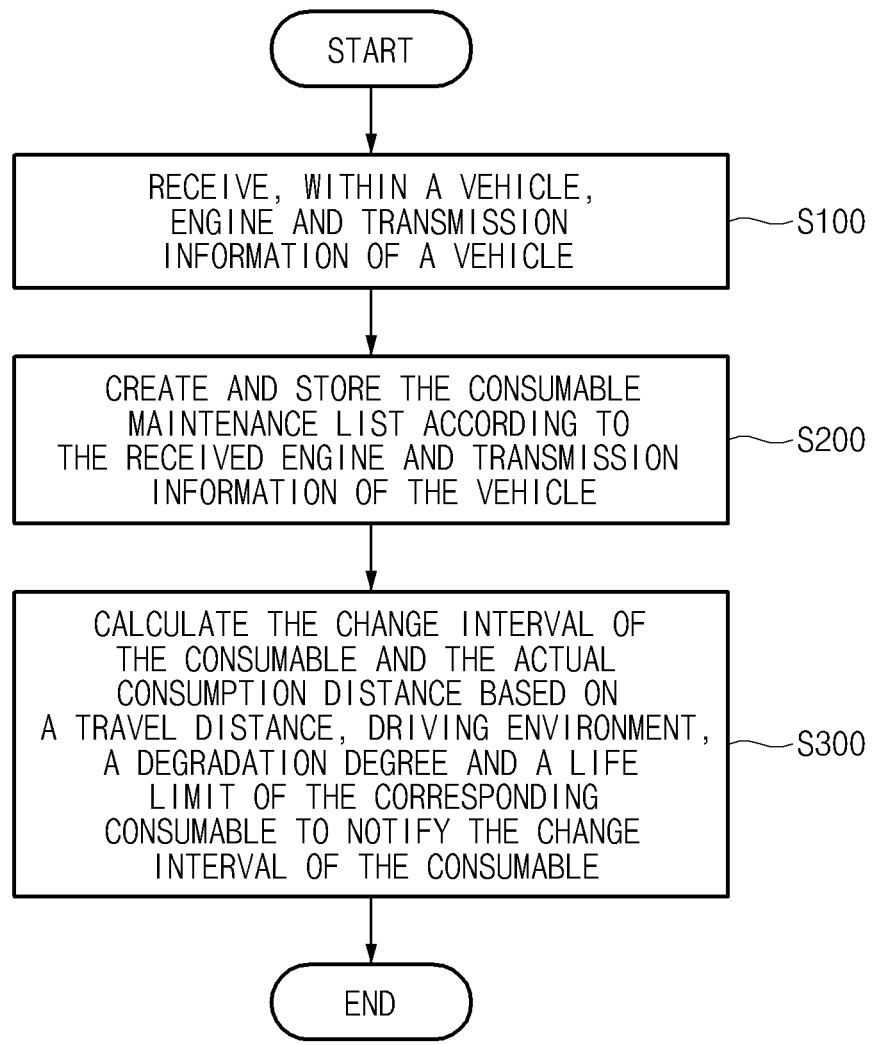
FIG. 2 is a flowchart diagram illustrating a method of maintaining a consumable according to an exemplary embodiment of the present invention.

Hereinafter, a method of maintaining a consumable according to an exemplary embodiment of the present invention will be described with reference to FIG. 2.

First, the control unit/controller 130 receives engine and transmission information relating to the vehicle from the engine controller 200 and the transmission controller 300 placed within the vehicle (S100) The controller 130 then creates and stores the consumable maintenance list based on the received engine and the transmission information of the vehicle in the storage unit 140, as shown in Table 1 (S200).

TABLE 1

| | Gasoline Engine | | Diesel Engine | |
|---|---|---|---|---|
| Consumables | Automatic Transmission | Manual Transmission | Automatic Transmission | Manual Transmission |
| Engine Oil and Filter | ○ | ○ | ○ | ○ |
| Air Cleaner Filter | ○ | ○ | ○ | ○ |
| Air Filter | ○ | ○ | ○ | ○ |
| Spark Plug | ○ | ○ | x | x |
| Brake Pad (Frt) | ○ | ○ | ○ | ○ |
| Brake Disk (Rear) | ○ | ○ | ○ | ○ |
| Break Drum (Rear) | ○ | ○ | ○ | ○ |
| Tire Positioning Change | ○ | ○ | ○ | ○ |
| Break Oil | ○ | ○ | ○ | ○ |
| Coolant | ○ | ○ | ○ | ○ |

TABLE 1-continued

| | Gasoline Engine | | Diesel Engine | |
|---|---|---|---|---|
| Consumables | Automatic Transmission | Manual Transmission | Automatic Transmission | Manual Transmission |
| Fuel Filter | ○ | ○ | ○ | ○ |
| Timing Belt | x | x | ○ (call for inspection) | ○ (call for inspection) |
| Belt Drive | ○ | ○ | ○ | ○ |
| Manual Transmission Oil | X | ○ (call for inspection) | x | ○ (call for inspection) |
| Automatic Transmission Oil | ○ (call for inspection) | x | ○ (call for inspection) | x |

In the consumable maintenance list shown in Table 1, a gasoline engine and a diesel engine are separated into different columns, each of which further contains different columns for an automatic transmission and a manual transmission.

Next, the control unit 130 calculates the change interval of the consumable and the actual consumption distance based on a travel distance, driving environment, a degradation degree and a life limit of the corresponding consumable records the calculated change interval of the consumable (S300).

Hereinafter, a method (S300) of determining a change interval of a consumable according to an exemplary embodiment of the present invention will be described with reference to FIG. 3.

First, the control unit 130 determines the change interval depending on whether the vehicle is driven under the general condition or under the severe condition by using the driving environment information (i.e., the road condition information and the driving habit information) (S301). Here, the road environment information is categorized as, for example, local streets, highways, unpaved roads, or paved roads, and the driving habit information is categorized as, for example, the economic driving habit, the normal driving habit, or the reckless driving habit. For example, the change interval under the severe condition applies to unpaved road driving by a driver having a reckless driving habit and the change interval under the general condition applies paved road driving by a driver having an economic driving habit.

Next, the control unit 130 calculates the actual consumption distance by multiplying the travel distance by the degradation weight, the degradation weight may be determined based on the temperature value measured by the sensor 400 (S302).

Next, the control unit 130 compares the calculated actual consumption distance with the change interval to compute the consumption rate of the consumable (S303). For example, it is determined whether the consumption rate is equal to or greater than 80% (S304). Additionally, when the consumption rate is less than 80%, it is determined whether the life limit of the consumable is reached (S305). If the life limit of the consumable is reached, the driver is notified when to replace or inspect the consumable through the display unit 150 (S306). Meanwhile, if the life limit of the consumable is not reached in step S305, the method is terminated.

In step S304, if the consumption rate is equal to or greater than 80%, the driver is instructed to change or check the consumable through the display unit 150 (S306). Here, if the consumption rate is equal to or greater than 100%, the vehicle has a chance of breaking down, and therefore, it is preferable to indicate a necessity of a vehicle inspection on the display unit as well.

Figure 3:
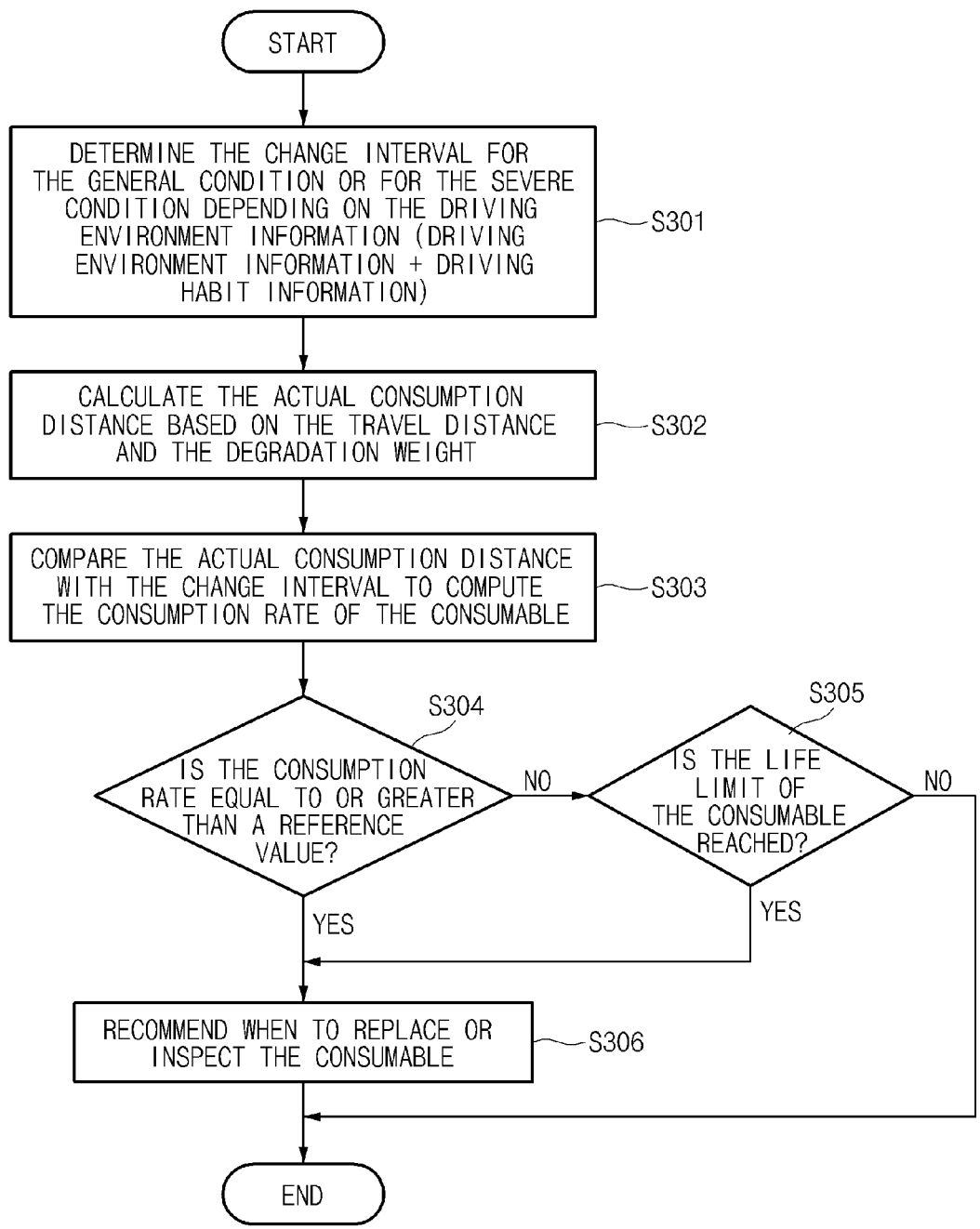
FIG. 3 is a flowchart diagram illustrating a method of determining an interval for changing a consumable according to an exemplary embodiment of the present invention.

Hereinafter, the process in FIG. 3 is described in an exemplary case where the consumable is a tire.

In this embodiment, it is assumed that the tire has been replaced 6 years ago, the degradation weight is 1.5, and the vehicle's operating condition is the general condition (i.e., highway driving by the driver with the economic driving habit)

First, the control unit 130 determines a tire replacement interval, for example purposes only, every 4 km under the general condition and every 2 km under the severe condition (i.e., the unpaved road driving by the driver with the reckless driving habit).

When the actual travel distance of the vehicle is 2 km, the actual consumption distance is calculated as, 2 km (actual travel distance)×1.5 (degradation weight)=3 km. Here, the control unit 130 compares the actual travel distance, i.e., 3 km, with the tire replacement interval under the general condition, i.e., 4 km, and calculates the consumption rate as 75%. Because the consumption rate is less than 80%, tire replacement is not recommended.

However, if a recommended tire life is 5 years and the tire was replaced 6 years ago, the tire can be chemically altered so it is preferable to recommend the tire replacement even when the consumption rate is less than 80%. Therefore, a recommendation to change the changes would be displayed on the drivers screen.

According to the present invention, the interval for changing the consumables of the vehicle are determined according to the engine type and the transmission type of the vehicle as well as in consideration of the driving distance and the driving environment of the vehicle and the degradation degree and the life limit of the consumable so that replacement of the consumable can be performed accurately and efficiently.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for maintaining a consumable, the system comprising:
    a storage unit configured to store a consumable maintenance list according to an engine type and a transmission type of a vehicle;
    a control unit configured to control recommendation of when to change the consumable by calculating a change interval of each consumable and an actual consumption distance in the consumable maintenance list; and
    a display unit configured to display a screen that recommends when to change the consumable,
    wherein the control unit is configured to calculate a degradation weight for each temperature range by using a temperature value of the consumable measured by a sensor.

2. The system of claim 1, wherein the control unit is configured to determine the change interval as a first change interval for a general condition or as a second change interval for a severe condition depending on road environment information and driving habit information.

3. The system of claim 1, wherein the control unit is configured to calculate the actual consumption distance by using an actual travel distance and the degradation weight.

4. The system of claim 1, wherein the control unit is configured to calculate a consumption rate of the consumable by comparing the actual consumption distance and the change interval.

5. The system of claim 4, wherein the control unit is configured to display a screen that recommends a change of the consumable when the consumption rate of the consumable is equal to or greater than a reference value, and is configured to control to display the screen that recommends the change of the consumable depending on whether a life limit of the consumable is reached when the consumption rate of the consumable is less than the reference value.

6. The system of claim 5, wherein the control unit is configured to control to display the screen that recommends the change of the consumable when the consumption rate of the consumable is less than the reference value and the life limit of the consumable is reached.

7. A method of maintaining a consumable, the method comprising:
    collecting, by a control unit within a vehicle, engine and transmission information of the vehicle:
    creating, by the control unit, and storing, within a storage unit, a consumable maintenance list based on the collected engine and transmission information of the vehicle;
    calculating, by the control unit a change interval of each consumable associated with a vehicle and an actual consumption distance in the consumable maintenance list; and
    notifying a driver about when to change the consumable according to the change interval and the actual consumption distance on a screen within the vehicle,
    wherein the calculating the change interval of each consumable and the actual consumption distance includes:
        receiving road environment information from a user and generating driving habit information by using vehicle speed information;
        determining the change interval as a first change interval for a general condition or as a second change interval for a severe condition by using the road environment information and the driving habit information;
        calculating a degradation weight according to a temperature range value of the consumable;
        calculating the actual consumption distance by using the degradation weight; and
        calculating a consumption rate of the consumable by comparing the change interval and the actual consumption distance.

8. The method of claim 7, wherein the receiving the road environment information from the user and the generating of the driving habit information includes,
    collecting the road environment information through a navigation or a global positioning system (GPS).

9. The method of claim 7, wherein calculating the actual consumption distance by using the degradation weight includes,
    calculating the actual consumption distance by multiplying an actual travel distance of the vehicle by the degradation weight.

10. The method of claim 7, wherein the notifying about when to change the consumable includes:
    recommending when to change the consumable when the consumption rate of the consumable is equal to or greater than a reference value; and recommending when to change the consumable depending on whether a life limit of the consumable is reached when the consumption rate of the consumable is less than the reference value.

11. The method of claim 10, wherein the recommending when to change the consumable depending on whether the life limit of the consumable is reached includes, recommending when to change the consumable when the consumption rate of the consumable is less than the reference value and the life limit of the consumable is reached.

12. A method of maintaining a consumable, the method comprising:

generating, by a control unit within a vehicle, a first change interval of the consumable for a general condition and a second change interval of the consumable for a severe condition by using road environment information and driving habit information;

calculating, by the control unit, a degradation weight according to a temperature range value of the consumable;

calculating, by the control unit, an actual consumption distance by using the degradation weight;

calculating, by the control unit, a consumption rate of the consumable by comparing the actual consumption distance with the first change interval of the consumable for the general condition or the second change interval of the consumable for the severe condition; and recommending, by the control unit, when to change the consumable according to the consumption rate and a life limit of the consumable.

13. The method of claim 12, wherein the recommending when to change the consumable includes:

recommending when to change the consumable when the consumption rate of the consumable is equal to or greater than a reference value; and recommending when to change the consumable when the consumption rate of the consumable is less than the reference value and the life limit of the consumable is reached.

14. The method of claim 12, wherein the calculating the actual consumption distance by using the degradation weight includes, calculating the actual consumption distance by multiplying an actual travel distance of the vehicle by the degradation weight.

* * * * *